US010869225B2

(12) United States Patent
Huang et al.

(10) Patent No.: US 10,869,225 B2
(45) Date of Patent: Dec. 15, 2020

(54) AUTOMATICALLY SELECT UPLINK BASED ON USER ANCHOR CONTROLLER

(71) Applicant: Hewlett Packard Enterprise Development, LP, Houston, TX (US)

(72) Inventors: Wei Huang, Beijing (CN); Kiranmaye Sirigineni, Santa Clara, CA (US); Huimeng Huang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/992,583

(22) Filed: May 30, 2018

(65) Prior Publication Data

US 2019/0239120 A1   Aug. 1, 2019

(30) Foreign Application Priority Data

Jan. 31, 2018  (CN) .......................... 2018 1 0094882

(51) Int. Cl.
| | | |
|---|---|---|
| *H04L 29/12* | (2006.01) | |
| *H04L 5/00* | (2006.01) | |
| *H04W 28/06* | (2009.01) | |
| *H04W 28/08* | (2009.01) | |
| *H04W 72/04* | (2009.01) | |
| *H04W 72/10* | (2009.01) | |
| *H04W 84/12* | (2009.01) | |
| *H04W 92/12* | (2009.01) | |

(52) U.S. Cl.
CPC .......... *H04W 28/08* (2013.01); *H04L 5/0044* (2013.01); *H04L 5/0062* (2013.01); *H04L 5/0064* (2013.01); *H04W 72/044* (2013.01); *H04W 72/0486* (2013.01); *H04W 72/10* (2013.01); *H04W 84/12* (2013.01); *H04W 92/12* (2013.01)

(58) Field of Classification Search
CPC ............ H04W 28/08; H04W 72/0486; H04W 72/044; H04W 72/10; H04W 84/12; H04W 92/12; H04W 28/06; H04L 5/0064; H04L 5/0044; H04L 5/0062; H04L 72/0486; H04L 84/12; H04L 72/10; H04L 72/044; H04L 92/12; H04L 61/2007
See application file for complete search history.

(56) References Cited

U.S. PATENT DOCUMENTS

| | | |
|---|---|---|
| 8,503,468 B2 | 8/2013 | Akyol et al. |
| 9,439,099 B2 | 9/2016 | Emmanuel et al. |
| 9,467,384 B2 | 10/2016 | Zhang et al. |
| 9,699,800 B2 | 7/2017 | Himayat et al. |
| 2014/0092723 A1* | 4/2014 | Murphy .............. H04L 41/0806 370/221 |

(Continued)

OTHER PUBLICATIONS

ExtremeWreless™ WiNG 5, (Research Paper), Nov. 5, 2013, 10 Pgs.
European Search Report and Search Opinion Received for EP Application No. 18174187.7, dated Dec. 3, 2018, 9 pages.

*Primary Examiner* — Moo Jeong
(74) *Attorney, Agent, or Firm* — Hewlett Packard Enterprise Patent Department

(57) ABSTRACT

An example device comprising: a processor to configure a user anchor controller (UAC) for each network controller when an access point (AP) is connected to at least two network controllers; assign each user of the AP to one of the UACs; and automatically select an uplink for each user based on the user's corresponding UAC to transmit the user's data traffic.

19 Claims, 5 Drawing Sheets

(56) References Cited

U.S. PATENT DOCUMENTS

2015/0312091 A1 10/2015 Yang et al.
2016/0227552 A1 8/2016 Kurmala et al.
2017/0078890 A1 3/2017 Zhu et al.

* cited by examiner

AUTOMATICALLY SELECT UPLINK BASED ON USER ANCHOR CONTROLLER

BACKGROUND

For better uplink bandwidth or reliability, access points (APs) use multiple uplink interfaces for link aggregation (LAG). For a centralized tunnel forwarding mode in a WLAN system, the uplink selection in LAG is based on wireless band A (5 GHz) or G (2.4 Hz) to balance the traffic while ensuring the correct sequence of delivered packets.

DETAILED DESCRIPTION

Figure 1:
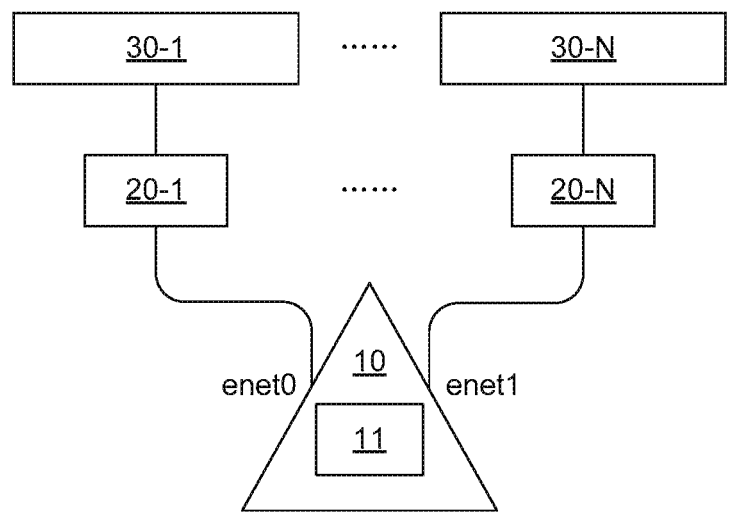
FIG. 1 is a block diagram illustrating an example WLAN including a wireless device capable of automatically select uplink based on user anchor controller (UAC) according to the present disclosure.

In LAG uplink selection, calculation is based on the characteristics in layer 2 and/or layer 3 headers of the network packets. This may be applicable to clear packets using the local forwarding mode because the characteristics in layer 2 and/or layer 3 header can be obtained directly from the clear packets.

However, for the centralized tunnel forwarding mode in a typical enterprise WLAN, since the packets are encapsulated in data tunnels, the characteristics in layer 2 and/or layer 3 header may not be obtained directly from the packets, this method can't spread the packets among uplinks well.

To support the centralized tunnel forwarding mode, the AP may spread the packets based on the wireless band on which the packets are received. For example, packets from band A and band G may be sent to different uplink interfaces. Therefore, the uplink selection in LAG may be based on the wireless band (e.g., band A or band G) that the packet is received from.

Since an AP may spread the packets in both wireless band A and G, two IP addresses are configured for and used by one AP at the same time. One IP address is used for packet transmission on wireless band A and the other IP is used for packet transmission on wireless band G.

In another example LAG uplink selection, an AP may spread the packets based on the inner destination MAC address in transmit direction and do packet re-ordering in receive direction. In this example, the AP may still need to be configured with two IP addresses, and the packets may also need to be reordered.

When an AP is linked on multiple network controllers like in a controller cluster scenario, the above example implementations may consume too much IP resource and may not fully make use of all uplinks.

Accordingly, in the examples herein, when an AP is connected to at least two network controllers, each network controller may be configured with a user anchor controller (UAC). That is to say, each UAC corresponds to a network controller. For example, if the AP is connected to N (N≥2) network controllers, N UACs may be configured accordingly for the N network controllers. As used herein, the UAC is a network device that is configured between an AP and a network controller. One AP can connect to multiple UACs, but one UAC connects to one AP and one network controller. Users of the AP can be assigned to the UAC, and the UAC can be assigned to an uplink interface of the AP. Therefore, it is possible to automatically select an uplink for each user based on the users corresponding UAC to transmit the user's data traffic.

Accordingly, each user of the AP may be assigned to one of the UACs. Then, for each user of the AP, an uplink may be automatically selected based on the user's corresponding UAC to transmit the user's data traffic. That is to say, the uplink may be selected based on the UAC instead of checking the wireless band or target MAC address for LAC uplink selection.

In a multiple network controllers scenario, since each network controller connected with the AP is configured with one UAC, and each user of the AP is assigned to one of the UACs, the user's data traffic is transmitted to the corresponding UAC. Further, each UAC may be assigned to an uplink interface of the AP. So, in both upstream and downstream packet transmissions, the UAC is the controller that is responsible for forwarding data traffic associated with a corresponding user(s).

Then, the user's data traffic is normally distributed among all uplink interfaces even in the same wireless band and doesn't consume any additional IP resources. So, each network controller may configure a single IP address for the AP instead of two IP addresses. No additional IP address is configured, and the IP resource is saved. The network controller may use half of the tunnel resources to transmit the user's data traffic. The UAC can preserve the order of packet delivery for a specific user, thus eliminating the effort of packet re-ordering. Therefore, while improving the AP's usage efficiency of multiple uplink interfaces in the case of multiple network controllers, it also saves the IP address resources used by the network controller.

In one example, a device may configure a UAC for each network controller when an AP is connected to at least two network controllers. The device can also assign each user of the AP to one of the UACs, and automatically select an uplink for each user based on the user's corresponding UAC to transmit the user's data traffic. Further, the device can assign each UAC to an uplink interface of the AP before selecting the uplink.

In another example, a method comprising configuring, by a processor of an AP, a UAC for each network controller when the AP is connected to at least two network controllers; assigning, by the processor, each user of the AP to one of the UACs; and automatically selecting, by the processor, an uplink for each user based on the user's corresponding UAC to transmit the user's data traffic.

In another example, a non-transitory computer readable storage medium storing instructions that, when executed by a processor of an AP, causes the processor to configure a UAC for each network controller when an AP is connected to at least two network controllers, to assign each user of the AP to one of the UACs, and to automatically select an uplink for each user based on the user's corresponding UAC to transmit the user's data traffic.

As used herein, a "network device" generally includes a device that is adapted to transmit and/or receive signaling and to process information within such signaling such as a station (e.g., any data processing equipment such as a computer, cellular phone, personal digital assistant, tablet devices, etc.), an access point, data transfer devices (such as network switches, routers, controllers, etc.) or the like. As used herein, an "access point" (AP) generally refers to receiving points for any known or convenient wireless access technology which may later become known. Specifically, the term AP is not intended to be limited to IEEE 802.11-based APs. APs generally function as an electronic device that is adapted to allow wireless devices to connect to a wired network via various communications standards.

It is appreciated that examples described herein below may include various components and features. Some of the components and features may be removed and/or modified without departing from a scope of the device, method and non-transitory computer readable storage medium for automatically select uplink based on UAC.

It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

FIG. 1 is a block diagram illustrating an example WLAN including a wireless device capable of automatically select uplink based on UAC according to the present disclosure. Referring to FIG. 1, a WLAN may include an AP 10, at least two UACs 20-1 to 20-N and at least two network controllers 30-1 to 30-N, where each network controller may uniquely correspond to one UAC.

For example, as shown in FIG. 1, the AP 10 may be connected to N network controllers 30-1, . . . , 30-N, so N UACs 20-1, . . . , 20-N may be set corresponding to the N network controllers 30-1, . . . , 30-N.

Further, the AP 10 may have two uplink interfaces, e.g. enet0 and enet1 as shown in FIG. 1. Then, before selecting the uplink for each user, each UAC may be assigned to an uplink interface of the AP 10. For example, as shown in FIG. 1, the UAC 20-1 is assigned to the uplink interface enet0 of the AP 10, and the UAC 20-N is assigned to the uplink interface enet1 of the AP 10.

The AP 10 includes a processor 11. When the AP 10 is connected to N network controllers, the processor 11 may configure N UACs corresponding to the N network controllers, and each UAC may correspond uniquely to one network controller.

Then, the processor 11 may assign each user of the AP 10 to one of the N UACs. For example, the processor 11 may evenly assign all its users to N UACs. For another example, the processor 11 may assign all users to N UACs according to the load of each UAC. For another example, the processor 11 may assign all users to N UACs based on the priority or role of each user.

Since each network controller connected with the AP 10 is configured with one UAC, and each user of the AP 10 is assigned to one UAC, the processor 11 may automatically select an uplink for each user based on the user's corresponding UAC to transmit the user's data traffic.

Further, the processor 11 may assign each UAC to an uplink interface of the AP 10. For example, the processor 11 may evenly assign all UACs to two uplink interfaces of the AP 10. For another example, the processor 11 may assign all UACs to two uplink interfaces of the AP 10 according to the load of each uplink interface. For another example, the processor 11 may assign all UACs to two uplink interfaces of the AP 10 based on the priority of each UAC. The priority of each UAC can be predetermined, e.g., the priority of the first UAC can be predetermined to have the highest priority, the priority of the second UAC can be predetermined to have the second priority, . . . , and so on. Therefore, the UAC with the highest priority can be assigned to the uplink interface enet0 and the UAC without the highest priority can be assigned to the uplink interface enet1, or vice versa.

Figure 2:
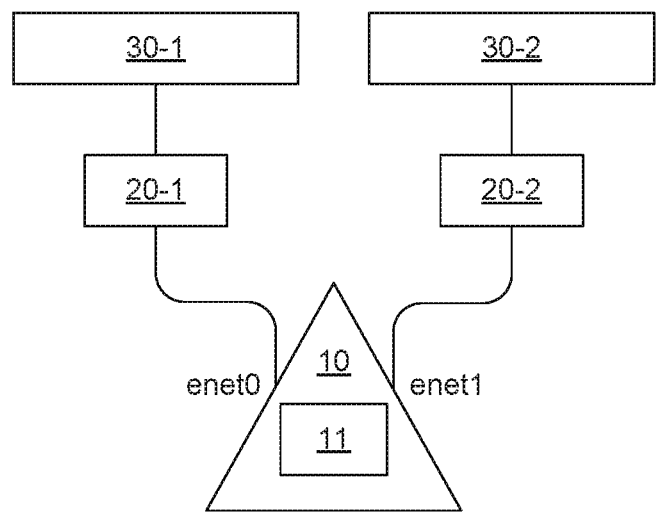
FIG. 2 is a block diagram illustrating an example WLAN including a wireless device capable of automatically select uplink based on UAC according to the present disclosure.

FIG. 2 is a block diagram illustrating an example WLAN including a wireless device capable of automatically select uplink based on UAC according to the present disclosure. Referring to FIG. 2, a WLAN may include an AP 10, two UACs (i.e. 20-1 and 20-2) and two network controllers (i.e. 30-1 and 30-2). The AP 10 may be connected to two network controllers 30-1 and 30-2.

The AP 10 includes a processor 11, the processor 11 may configure two UACs (e.g., 20-1 and 20-2) corresponding to the two network controllers (e.g., 30-1 and 30-2), and each UAC may correspond uniquely to one network controller.

Then, the processor 11 may assign each user of the AP 10 to one of the UACs. For example, the processor 11 may evenly assign all its users to two UACs (such as, when the AP 10 has 2*M users, the processor 11 may assign the first M users to UAC 20-1, and assign the last M users to UAC 20-2, or vice versa). For another example, the processor 11 may assign all users to two UACs according to the load of each UAC. For another example, the processor 11 may assign all users to two UACs based on the priority or role of each user.

Since each network controller connected with the AP 10 is configured with one UAC, and each user of the AP 10 is assigned to one UAC, the processor 11 may automatically select an uplink for each user based on the user's corresponding UAC to transmit the user's data traffic.

Further, the AP 10 may have two uplink interfaces, e.g. enet0 and enet1 as shown in FIG. 2. So, the processor 11 may assign each UAC to an uplink interface of the AP 10.

For example, the processor 11 may evenly assign all UACs to two uplink interfaces of the AP 10, such as, as shown in FIG. 2, the UAC 20-1 is assigned to the uplink interface enet0 of the AP 10, and the UAC 20-2 is assigned to the uplink interface enet1 of the AP 10, or vice versa.

For another example, the processor 11 may assign all UACs to two uplink interfaces of the AP 10 according to the load of each uplink interface. When the assignment is based on the load of each uplink interface, all UACs may be dynamically assigned to two uplink interfaces of the AP 10. For instance, at one point of time, when the uplink interface enet0 has a low load, the enet0 may be the uplink interface transmitting user data traffic to two UACs (e.g., 20-1, 20-2); and at a future point of time, when the enet0 has a high load, the same enet0 may transmit user data traffic to a single UAC (e.g., 20-1).

For another example, the processor 11 may assign all UACs to two uplink interfaces of the AP 10 based on the priority of each UAC. The priority of each UAC can be predetermined, e.g., the priority of the UAC 20-1 can be predetermined to have the highest priority, the priority of the UAC 20-2 can be predetermined to have the second priority, or vice versa. Therefore, such as, as shown in FIG. 2, the UAC 20-1 can be assigned to the uplink interface enet0 of the AP 10, and the UAC 20-2 can be assigned to the uplink interface enet1 of the AP 10, or vice versa.

Figure 3:
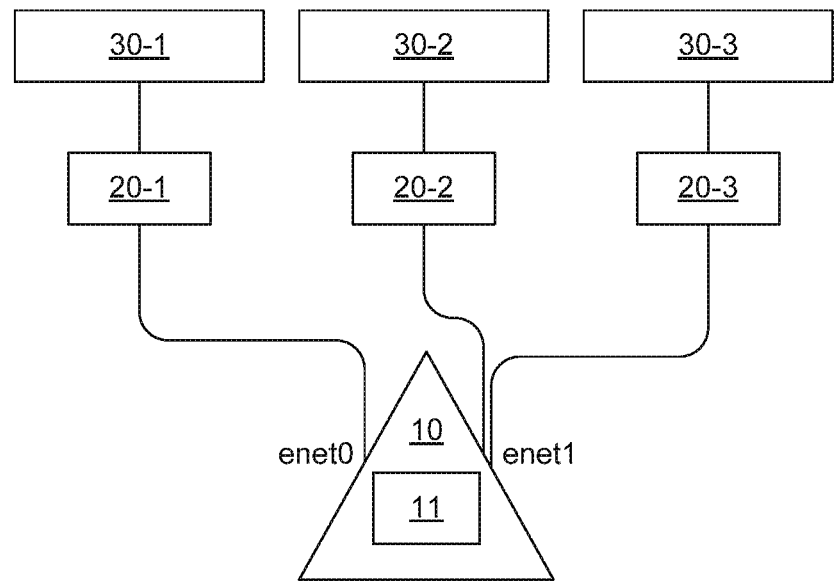
FIG. 3 is a block diagram illustrating an example WLAN including a wireless device capable of automatically select uplink based on UAC according to the present disclosure.

FIG. 3 is a block diagram illustrating an example WLAN including a wireless device capable of automatically select uplink based on UAC according to the present disclosure. Referring to FIG. 3, a WLAN may include an AP 10, three UACs (i.e. 20-1, 20-2 and 20-3) and three network controllers (i.e. 30-1, 30-2 and 30-3). The AP 10 may be connected to three network controllers 30-1, 30-2 and 30-3.

The AP 10 includes a processor 11, the processor 11 may configure three UACs (i.e. 20-1, 20-2 and 20-3) corresponding to the three network controllers (i.e. 30-1, 30-2 and 30-3), and each UAC may correspond uniquely to one network controller.

Then, the processor 11 may assign each user of the AP 10 to one of the UACs. For example, the processor 11 may evenly assign all its users to three UACs (such as, when the AP 10 has 3*M users, the processor 11 may assign the first M users to UAC 20-1, assign the second M users to UAC 20-2, and assign the last M users to UAC 20-3). For another example, the processor 11 may assign all users to three UACs according to the load of each UAC. For another example, the processor 11 may assign all users to three UACs based on the priority of each user.

Since each network controller connected with the AP 10 is configured with one UAC, and each user of the AP 10 is assigned to one UAC, the processor 11 may automatically select an uplink for each user based on the user's corresponding UAC to transmit the user's data traffic.

Further, the AP 10 may have two uplink interfaces, e.g. enet0 and enet1 as shown in FIG. 3. So, the processor 11 may assign each UAC to an uplink interface of the AP 10.

For example, the processor 11 may evenly assign all UACs to two uplink interfaces of the AP 10, such as, as shown in FIG. 3, the UAC 20-1 is assigned to the uplink interface enet0 of the AP 10, the UAC 20-2 and UAC 20-3 are assigned to the uplink interface enet1 of the AP 10.

For another example, the processor 11 may assign all UACs to two uplink interfaces of the AP 10 according to the load of each uplink interface. When the assignment is based on the load of each uplink interface, all UACs may be dynamically assigned to two uplink interfaces of the AP 10. For instance, at one point of time, when the uplink interface enet0 has a low load, the enet0 may be the uplink interface transmitting user data traffic to two UACs (e.g., 20-1, 20-2); and at a future point of time, when the enet0 has a high load, the same enet0 may transmit user data traffic to a single UAC (e.g., 20-1).

For another example, the processor 11 may assign all UACs to two uplink interfaces of the AP 10 based on the priority of each UAC. The priority of each UAC can be predetermined, e.g., the priority of the UAC 20-1 can be predetermined to have the highest priority, the priority of the UAC 20-2 and UAC 20-3 can be predetermined to have the second priority, or vice versa. Therefore, such as, as shown in FIG. 3, the UAC 20-1 can be assigned to the uplink interface enet0 of the AP 10, and the UAC 20-2 and UAC 20-3 can be assigned to the uplink interface enet1 of the AP 10, or vice versa.

Figure 4:
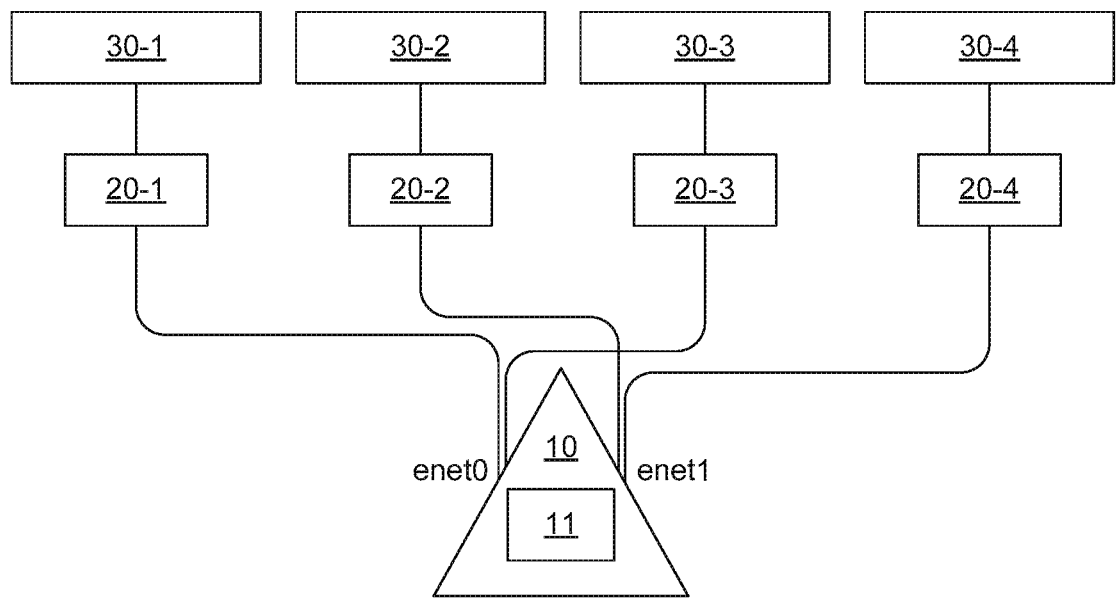
FIG. 4 is a block diagram illustrating an example WLAN including a wireless device capable of automatically select uplink based on UAC according to the present disclosure.

FIG. 4 is a block diagram illustrating an example WLAN including a wireless device capable of automatically select uplink based on UAC according to the present disclosure. Referring to FIG. 4, a WLAN may include an AP 10, four UACs (i.e. 20-1, 20-2, 20-3 and 20-4) and four network controllers (i.e. 30-1, 30-2, 30-3 and 30-4). The AP 10 may be connected to four network controllers 30-1, 30-2, 30-3 and 30-4.

The AP 10 includes a processor 11, the processor 11 may configure four UACs (i.e. 20-1, 20-2, 20-3 and 20-4) corresponding to the four network controllers (i.e. 30-1, 30-2, 30-3 and 30-4), and each UAC may correspond uniquely to one network controller.

Then, the processor 11 may assign each user of the AP 10 to one of the UACs. For example, the processor 11 may evenly assign all its users to four UACs (such as, when the AP 10 has 4*M users, the processor 11 may assign the first M users to UAC 20-1, assign the second M users to UAC 20-2, assign the third M users to UAC 20-3, and assign the last M users to UAC 20-4). For another example, the processor 11 may assign all users to four UACs according to the load of each UAC. For another example, the processor 11 may assign all users to four UACs based on the priority of each user.

Since each network controller connected with the AP 10 is configured with one UAC, and each user of the AP 10 is assigned to one UAC, the processor 11 may automatically select an uplink for each user based on the user's corresponding UAC to transmit the user's data traffic.

Further, the AP 10 may have two uplink interfaces, e.g. enet0 and enet1 as shown in FIG. 4. So, the processor 11 may assign each UAC to an uplink interface of the AP 10.

For example, the processor 11 may evenly assign all UACs to two uplink interfaces of the AP 10, such as, as shown in FIG. 4, the UAC 20-1 and UAC 20-3 are assigned to the uplink interface enet0 of the AP 10, the UAC 20-2 and UAC 20-4 are assigned to the uplink interface enet1 of the AP 10.

For another example, the processor 11 may assign all UACs to two uplink interfaces of the AP 10 according to the load of each uplink interface.

For another example, the processor 11 may assign all UACs to two uplink interfaces of the AP 10 based on the priority of each UAC.

Figure 5:
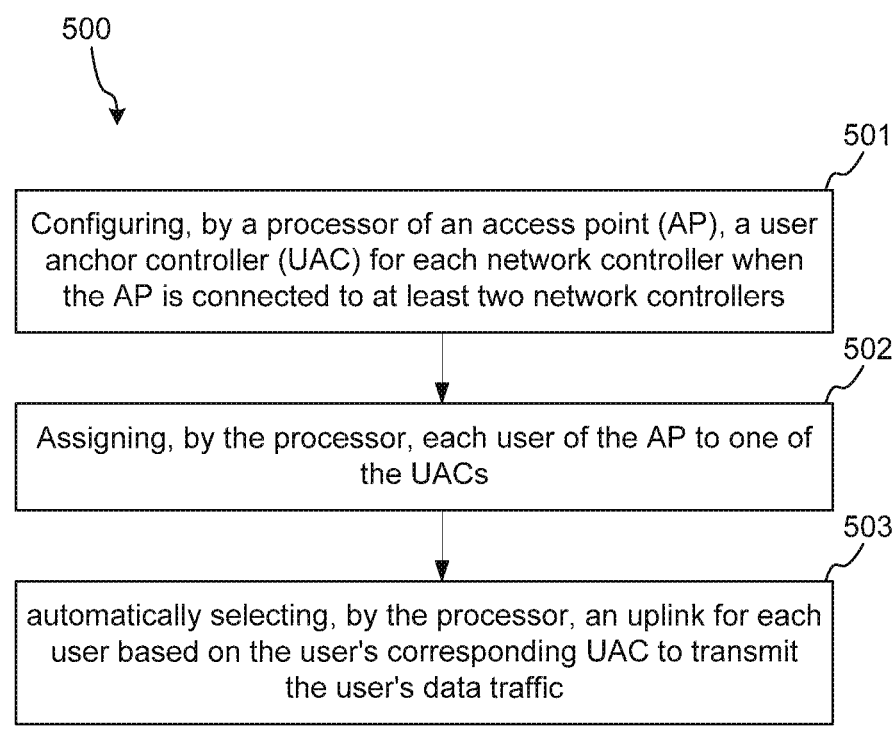
FIG. 5 is a flow chart illustrating an example method for automatically selecting uplink based on UAC according to present disclosure.

FIG. 5 is a flow chart illustrating an example method for automatically selecting uplink based on UAC according to present disclosure.

Referring to FIG. 5: A method 500 comprises: configuring, by a processor of an AP, a UAC for each network controller when the AP is connected to at least two network controllers, at 501. In an example, the AP may be connected to N network controllers. The processor of the AP may configure N UACs corresponding to the N network controllers, and each UAC may correspond uniquely to one network controller.

The method 500 further comprises assigning, by the processor, each user of the AP to one of the UACs, at 502. In an example, the processor may evenly assign all its users to UACs. In another example, the processor may assign all users to UACs according to the load of each UAC. In another example, the processor may assign all users to UACs based on the priority of each user.

The method 500 also comprises automatically selecting, by the processor, an uplink for each user based on the user's corresponding UAC to transmit the user's data traffic, at 503.

Figure 6:
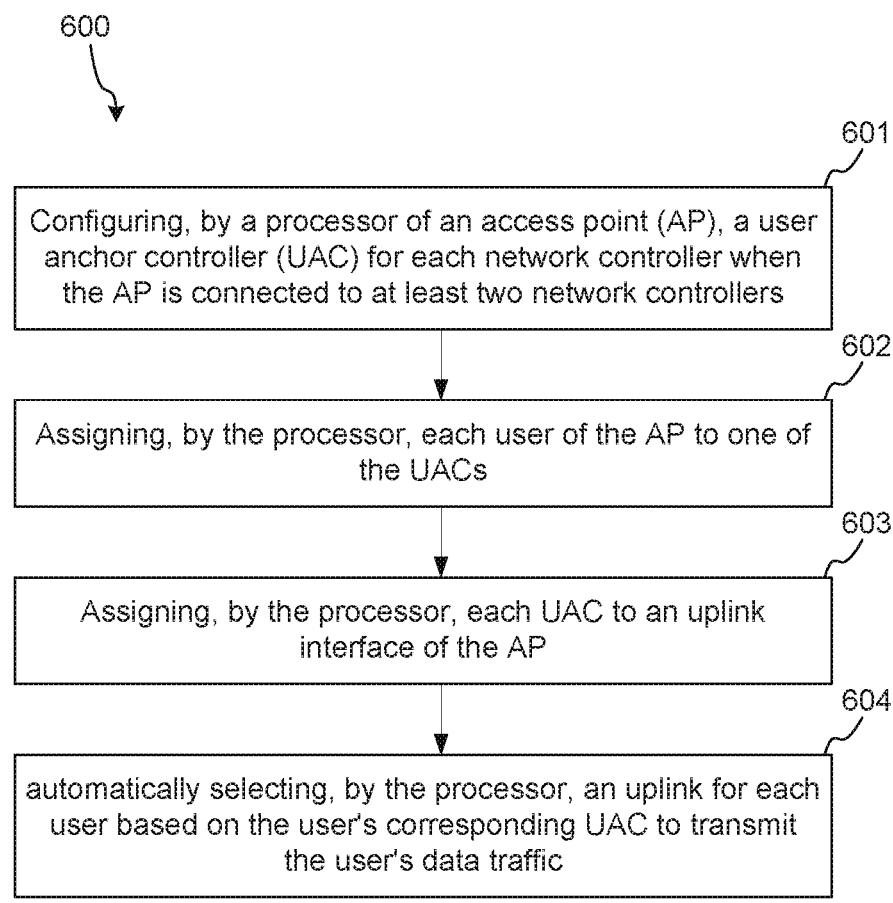
FIG. 6 is a flow chart illustrating an example method for automatically selecting uplink based on UAC according to present disclosure.

FIG. 6 is a flow chart illustrating an example method for automatically select uplink based on UAC according to present disclosure.

Referring to FIG. 6:

A method 600 comprises: configuring, by a processor of an AP, a UAC for each network controller when the AP is connected to at least two network controllers, at 601. In an example, the AP may be connected to N network controllers. The processor of the AP may configure N UACs corresponding to the N network controllers, and each UAC may correspond uniquely to one network controller.

The method 600 comprises assigning, by the processor, each user of the AP to one of the UACs, at 602. In an example, the processor may evenly assign all its users to UACs. In another example, the processor may assign all users to UACs according to the load of each UAC. In another example, the processor may assign all users to UACs based on the priority of each user.

The method 600 comprises assigning, by the processor, each UAC to an uplink interface of the AP, at 603. In an example, the processor may evenly assign all UACs to uplink interfaces of the AP. In another example, the processor may assign all UACs to uplink interfaces of the AP according to the load of each uplink interface. In another example, the processor may assign all UACs to uplink interfaces of the AP based on the priority of each UAC.

The method 600 comprises automatically selecting, by the processor, an uplink for each user based on the user's corresponding UAC to transmit the user's data traffic, at 604.

Figure 7:
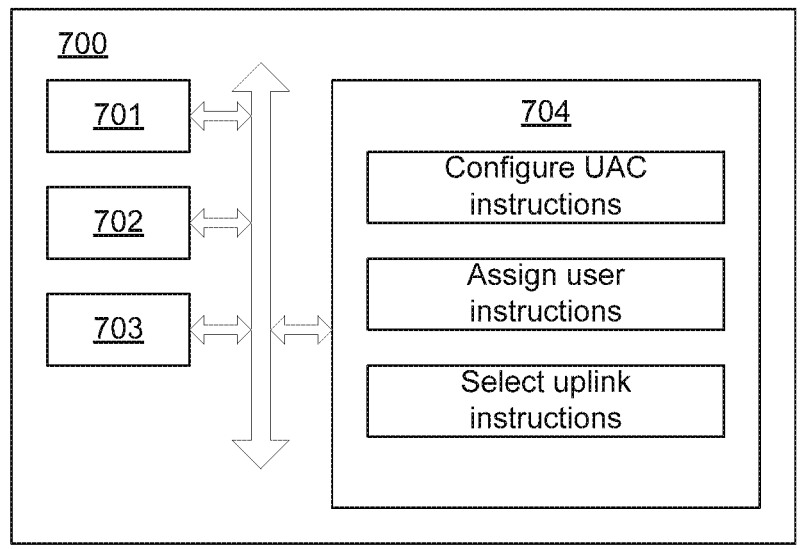
FIG. 7 is a block diagram illustrating example components for implementing the device shown in FIG. 1 according to present disclosure.

FIG. 7 is a block diagram illustrating example device shown in FIG. 1 according to present disclosure. The device 700 includes a first uplink interface 701, a second uplink interface 702, a processor 703 and and/or a non-transitory computer readable storage medium 704.

The non-transitory computer readable storage medium 704 stores instructions executable for the possessor 703.

The instructions include configure UAC instructions that, when executed by the processor 703, cause the processor 703 to configure a UAC for each network controller when the AP is connected to at least two network controllers.

The instructions include assign user instructions that, when executed by the processor 703, cause the processor 703 to assign each user of the AP to one of the UACs.

The instructions include select uplink instructions that, when executed by the processor 703, cause the processor 703 to automatically select an uplink for each user based on the user's corresponding UAC to transmit the user's data traffic.

Figure 8:
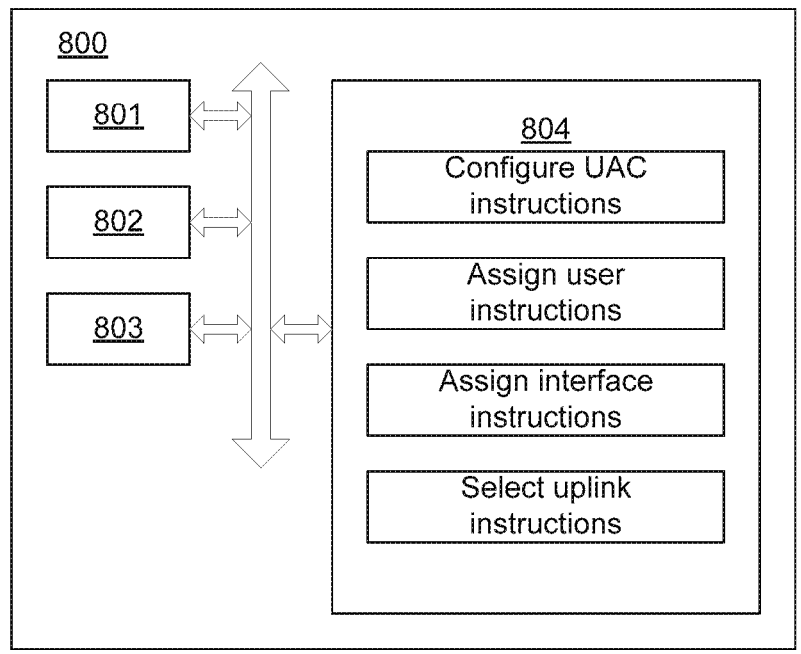
FIG. 8 is a block diagram illustrating example components for implementing the device shown in FIG. 1 according to present disclosure.

FIG. 8 is a block diagram illustrating an example device shown in FIG. 1 according to present disclosure. The device 800 includes a first uplink interface 801, a second uplink interface 802, a processor 803 and and/or a non-transitory computer readable storage medium 804.

The non-transitory computer readable storage medium 804 stores instructions executable for the possessor 803.

The instructions include configure UAC instructions, when executed by the processor 803, causes the processor 803 to configure a UAC for each network controller when the AP is connected to at least two network controllers.

The instructions include assign user instructions that, when executed by the processor 803, cause the processor 803 to assign each user of the AP to one of the UACs.

The instructions include assign interface instructions that, when executed by the processor 803, cause the processor 803 to assign each UAC to an uplink interface of the AP.

The instructions include select uplink instructions that, when executed by the processor 803, cause the processor 803 to automatically select an uplink for each user based on the user's corresponding UAC to transmit the user's data traffic.

While the present disclosure has been described in connection with certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. An access point for a wireless network comprising a processor to:
   configure a first user anchor controller between the access point and a first network controller of a plurality of network controllers connected to the access point;
   configure a second user anchor controller between the access point and a second network controller of the plurality of network controllers, the second controller being different than the first network controller;
   assign a first user of the access point to one of the first user anchor controller or the second user anchor controller; and
   automatically select an uplink to transmit data traffic for the first user based on the user anchor controller assigned to the first user, wherein the first user anchor controller corresponds uniquely to the first network controller and the second user anchor controller corresponds uniquely to the second network controller, wherein the first user anchor controller corresponding uniquely to the first network controller indicates that the first user anchor controller is connected to only the first network controller among the plurality of network controllers, wherein the second user anchor controller corresponding uniquely to the second network controller indicates that the second user anchor controller is connected to only the second network controller among the plurality of network controllers, and wherein each of the first user anchor controller and the second user anchor controller is a different network device than each of the first network controller and the second network controller.

2. The access point of claim 1, the processor is further to:
   assign a second user of the access point to one of the first user anchor controller or the second user anchor controller; and
   automatically select an uplink to transmit data traffic for the second user based on the user anchor controller assigned to the second user.

3. The access point of claim 1, the processor is further to:
   assign one or more users of the access point to one of the first user anchor controller or the second user anchor controller based upon a first load of the first user anchor controller and a second load of the second user anchor controller.

4. The access point of claim 1, wherein the processor is further to:

assign one or more users of the access point to one of the first user anchor controller or the second user anchor controller based on a priority or a role of the one or more users.

5. The access point of claim 1, wherein the processor is further to:
assign the first user anchor controller and the second anchor controller to one or more uplink interfaces of the access point before selecting the uplink.

6. The access point of claim 5, wherein the one or more uplink interfaces comprise a first uplink interface and a second uplink interface, and wherein the processor is further to:
assign the first user anchor controller to the first uplink interface of the access point; and
assign the second user anchor controller to the second uplink interface of the access point.

7. The access point of claim 5, wherein the one or more uplink interfaces comprise a first uplink interface and a second uplink interface, and wherein the processor is further to:
assign the first user anchor controller to one of the first uplink interface of the access point or the second uplink interface of the access point based upon a first load of the first uplink interface or a second load of the second uplink interface.

8. The access point of claim 5, wherein the one or more uplink interfaces comprise a first uplink interface and a second uplink interface, and wherein the processor is further to:
assign at least one of the first user anchor controller or the second anchor controller to at least one of the first uplink interface or the second uplink interface based upon a first priority associated with the first anchor controller or a second priority associated with the second anchor controller.

9. A method comprising:
configuring, by a processor of an access point, a first user anchor controller between the access point and a first network controller of a plurality of network controllers connected to the access point;
configuring a second user anchor controller between the access point and a second network controller of the plurality of network controllers, the second network controller being different than the first network controller;
assigning, by the processor, a first user of the access point to one of the first user anchor controller or the second anchor controller; and
automatically selecting, by the processor, an uplink to transmit data traffic for the first user based on the user anchor controller assigned to the first user, wherein the first user anchor controller corresponds uniquely to the first network controller and the second user anchor controller corresponds uniquely to the second network controller, wherein the first user anchor controller corresponding uniquely to the first network controller indicates that the first user anchor controller is connected to only the first network controller among the plurality of network controllers, wherein the second user anchor controller corresponding uniquely to the second network controller indicates that the second user anchor controller is connected to only the second network controller among the plurality of network controllers, and wherein each of the first user anchor controller and the second user anchor controller is a different network device than each of the first network controller and the second network controller.

10. The method of claim 9, further comprising:
assigning a second user of the access point to one of the first user anchor controller or the second user anchor controller; and
automatically selecting an uplink communication path to transmit data traffic for the second user based on the user anchor controller assigned to the second user.

11. The method of claim 10, further comprising:
assigning one or more users of the access point to one of the first user anchor controller or the second user anchor controller based upon a first load of the first user anchor controller and a second load of the second user anchor controller.

12. The method of claim 11, further comprising:
assigning, by the processor, one or more users of the access point to one of the first user anchor controller or the second user anchor controller based on a priority or a role of the one or more users.

13. The method of claim 9, further comprising:
assigning, by the processor, the first user anchor controller and the second anchor controller to one or more uplink interfaces of the access point before selecting the uplink.

14. A non-transitory computer readable storage medium storing instructions that, when executed by a processor of an access point (AP), causes the processor to:
configure a first user anchor controller between the access point and a first network controller of a plurality of network controllers connected to the access point;
configure a second user anchor controller between the access point and a second network controller of the plurality of network controllers, the second network controller being different than the first network controller;
assign a first user of the access point to one of the first user anchor controller or the second anchor controller; and
automatically select an uplink to transmit data traffic for the first user of the access point based on the user anchor controller assigned to the first user, wherein the first user anchor controller corresponds uniquely to the first network controller and the second user anchor controller corresponds uniquely to the second network controller, wherein the first user anchor controller corresponding uniquely to the first network controller indicates that the first user anchor controller is connected to only the first network controller among the plurality of network controllers, wherein the second user anchor controller corresponding uniquely to the second network controller indicates that the second user anchor controller is connected to only the second network controller among the plurality of network controllers, and wherein each of the first user anchor controller and the second user anchor controller is a different network device than each of the first network controller and the second network controller.

15. The non-transitory computer readable storage medium of claim 14, further storing instructions that, when executed by the processor, causes the processor to:
assign the first user anchor controller and the second anchor controller to one or more uplink interfaces of the access point before selecting the uplink.

16. The non-transitory computer readable storage medium of claim 14, further storing instructions that, when executed by the processor, causes the processor to:

assign a second user of the access point to one of the first user anchor controller or the second user anchor controller; and automatically select an uplink to transmit data traffic for the second user based on the user anchor controller assigned to the second user.

17. The non-transitory computer readable storage medium of claim 14, further storing instructions that, when executed by the processor, causes the processor to:

assign one or more users of the access point to one of the first user anchor controller or the second user anchor controller based upon a first load of the first user anchor controller and a second load of the second user anchor controller.

18. The non-transitory computer readable storage medium of claim 14, further storing instructions that, when executed by the processor, causes the processor to:

assign one or more users of the access point to one of the first user anchor controller or the second user anchor controller based on a priority or a role of the one or more users.

19. The non-transitory computer readable storage medium of claim 14, wherein the one or more uplink interfaces comprise a first uplink interface and a second uplink interface, and further storing instructions that, when executed by the processor, causes the processor to:

assign the first user anchor controller to the first uplink interface of the access point; and assign the second user anchor controller to the second uplink interface of the access point.

* * * * *